US008995007B2

(12) United States Patent
Uchino

(10) Patent No.: US 8,995,007 B2
(45) Date of Patent: Mar. 31, 2015

(54) IMAGE FORMING APPARATUS, PROGRAM FOR THE SAME, AND METHOD FOR MONITORING RECORDING MEDIUM CONVEYANCE IN THE SAME

(75) Inventor: Shunji Uchino, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 140 days.

(21) Appl. No.: 13/364,771

(22) Filed: Feb. 2, 2012

(65) Prior Publication Data

US 2012/0250038 A1 Oct. 4, 2012

(30) Foreign Application Priority Data

Mar. 30, 2011 (JP) ................................ 2011-076386

(51) Int. Cl.
*G06K 15/02* (2006.01)
*B41J 11/00* (2006.01)
*B65H 7/20* (2006.01)

(52) U.S. Cl.
CPC ............ *B41J 11/0095* (2013.01); *B41J 11/006* (2013.01); *B65H 7/20* (2013.01); *B65H 2511/11* (2013.01); *B65H 2511/20* (2013.01); *B65H 2553/00* (2013.01); *B65H 2553/82* (2013.01); *B65H 2557/23* (2013.01)
USPC ............................................................ 358/1.5

(58) Field of Classification Search
USPC .................................................. 358/1.15, 1.5
See application file for complete search history.

(56) References Cited

U.S. PATENT DOCUMENTS

2010/0074640 A1* 3/2010 Okano ............................ 399/45

FOREIGN PATENT DOCUMENTS

JP 2004-009473 1/2004
JP 2009-018873 1/2009
JP 2009-084038 4/2009

OTHER PUBLICATIONS

Machine translation for JP2009-084038, IDS.*
Japanese Official Action dated Jan. 15, 2013 from related application JP 2011-076386 together with a partial English language translation.

* cited by examiner

*Primary Examiner* — Qian Yang
(74) *Attorney, Agent, or Firm* — Scully, Scott, Murphy & Presser PC

(57) ABSTRACT

An image forming apparatus may include a conveyor unit configured to convey a recording medium along a conveying path, first and second sensors disposed in the conveying path and configured to detect the recording medium, a memory, and a controller configured to determine whether a length of the recording medium is less than or equal to a conveying distance between the first sensor and the second sensor. The controller may also be configured to perform storing processes for storing detection results of the first sensor and the second sensor in the memory when the controller determines that the length of the recording medium is less than or equal to the conveying distance.

16 Claims, 8 Drawing Sheets

IMAGE FORMING APPARATUS, PROGRAM FOR THE SAME, AND METHOD FOR MONITORING RECORDING MEDIUM CONVEYANCE IN THE SAME

CROSS REFERENCE TO RELATED APPLICATION

This application claims priority from Japanese Patent Application No. 2011-76386, filed on Mar. 30, 2011, the entire subject matter of which is incorporated herein by reference.

TECHNICAL FIELD

The invention relates to a technique for detecting a recording medium remaining in a conveying path of an image forming apparatus.

BACKGROUND

Conventionally, in an image forming apparatus, e.g., a printer and a facsimile machine, it is detected whether a recording medium remains in a conveying path when an error occurred during conveyance of the recording medium. There has been known, for example, an image forming apparatus that comprises a pickup device, which feeds recording media, one by one, a storage device, which stores a value obtained by adding a certain value to the stored value every time a recording medium is fed and reducing the certain value from the stored value every time print data is processed, and an output device, which outputs the value stored in the storage device as the number of recording media remaining in the image forming apparatus when an error occurred in the conveyance of the recording medium. In the image forming apparatus, the number of recording media remaining in the image forming apparatus can be obtained when an error occurred in the conveyance of the recording medium.

There has been known a sheet handling device that comprises a plurality of sensors disposed at a plurality of respective positions in a conveying path to detect passage of leading and trailing edges of a recording medium (a sheet). In the sheet handling device, when a controller cannot detect states (on/off) of the sensors disposed in a downstream part of the conveying path within a predetermined time after detecting states (on/off) of the sensors disposed in an upstream part of the conveying path, the controller determines that a paper jam has occurred and stops the operation of the sheet handling device.

In a case where the presence or absence of a remaining recording medium is determined by using a detection signal from the sensors as described above, generally, a state of a control flag is changed between on and off when a detection signal is sent from the upstream sensor or the downstream sensor. A rewritable storage stores the control flag. The controller accesses the storage device to rewrite the control flag every time the controller receives a detection signal.

SUMMARY

Recently, the printing speed has been enhanced. Therefore, a distance between a preceding recording medium and a next-following recording medium to be successively conveyed, i.e., a sheet-to-sheet distance, may tend to be shorter. Because the recording medium is conveyed at high speed in addition to the shorter distance between the recording media successively conveyed, a frequency of sending detection signals to the controller from the sensors that detected a leading or trailing edge of the recording medium becomes higher. As a result, a frequency of access to the storage device by the controller to rewrite the control flag may also become higher. This may cause an increase of a processing load of the controller.

Embodiments provide for a technique for reducing a processing load to detect a recording medium remaining in an image forming apparatus.

An image forming apparatus may include a conveyor unit configured to convey a recording medium along a conveying path, an image forming unit disposed in the conveying path and configured to form an image onto the recording medium conveyed along the conveying path, a first sensor disposed in the conveying path at a detecting position upstream from the image forming unit and configured to detect the recording medium, a second sensor disposed in the conveying path at a detecting position downstream from the image forming unit and configured to detect the recording medium, a memory, and a controller configured to determine whether a length of the recording medium is less than or equal to a conveying distance between the detecting positions of the first sensor and the second sensor. The controller configured to perform a first storing process for storing a first detection result of the first sensor in the memory and a second storing process for storing a second detection result of the second sensor in the memory when the controller determines that the length of the recording medium is less than or equal to the conveying distance between the detecting positions.

A method for monitoring conveyance of a recording medium in an image forming apparatus including a conveyor unit configured to convey a recording medium along a conveying path, an image forming unit disposed in the conveying path and configured to form an image onto the recording medium conveyed along the conveying path, a first sensor disposed in the conveying path at a detecting position upstream from the image forming unit and configured to detect the recording medium, a second sensor disposed in the conveying path at a detecting position downstream from the image forming unit and configured to detect the recording medium, and a memory, the method comprising the steps of determining whether a length of the recording medium is less than or equal to a conveying distance between the detecting positions of the first sensor and the second sensor, and performing a first storing process for storing a first detection result of the first sensor in the memory and a second storing process for storing a second detection result of the second sensor in the memory when the controller determines that the length of the recording medium is less than or equal to the conveying distance between the detecting positions.

A computer-readable storage device storing a computer-executable program executable by a processor of an image forming apparatus including a conveyor unit configured to convey a recording medium along a conveying path, an image forming unit disposed in the conveying path and configured to form an image onto the recording medium conveyed along the conveying path, a first sensor disposed in the conveying path at a detecting position upstream from the image forming unit and configured to detect the recording medium, a second sensor disposed in the conveying path at a detecting position downstream from the image forming unit and configured to detect the recording medium, and a memory. The program may cause the processor to execute functions comprising a function of determining whether a length of the recording medium is less than or equal to a conveying distance between the detecting positions of the first sensor and the second sensor, and a function of performing a first storing process for storing a first detection result of the first sensor in the memory and a second storing process for storing a second detection result of the second sensor in the memory when the controller determines that the length of the recording medium is less than or equal to the conveying distance between the detecting positions.

According to the invention, a frequency of rewriting the detection results stored in the memory can be reduced as compared with a case where the detection results are rewritten for each recording medium at all times. Therefore, a load on processing for rewriting the detection results stored in the memory, and by extension, on a load on processing for detecting a recording medium remaining in the image forming apparatus can be reduced.

BRIEF DESCRIPTION OF THE DRAWINGS

Illustrative aspects will be described in detail with reference to the following figures in which like elements are labeled with like numbers and in which.

DETAILED DESCRIPTION

Figure 1:
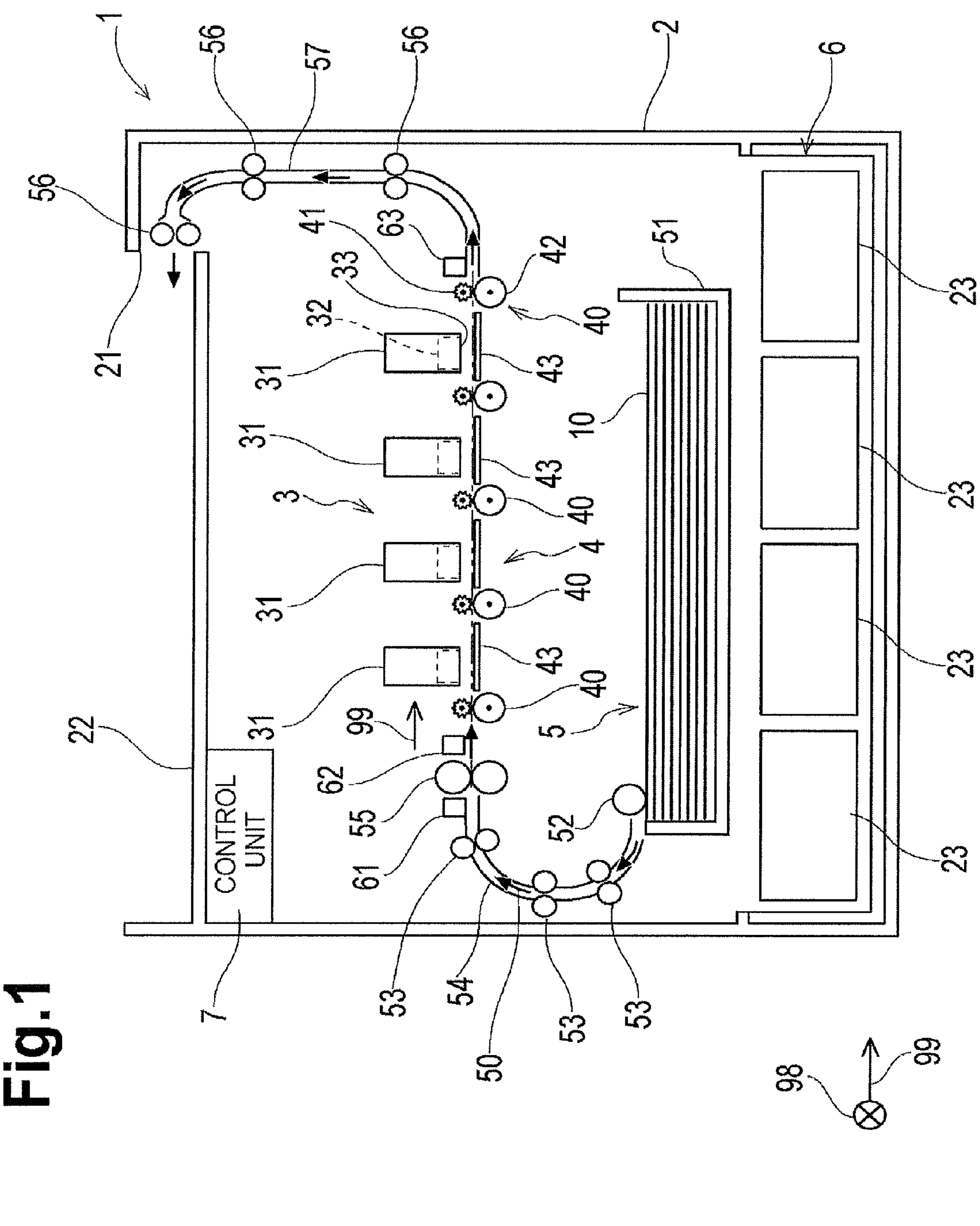
FIG. 1 is a side sectional view schematically showing an overall structure of an inkjet printer in an embodiment according to one or more aspects of the invention.

Embodiments will be described in detail with reference to the accompanying drawings. In the embodiments, an image forming apparatus according to the invention will be applied to an inkjet printer as an example of the image forming apparatus. Like elements are labeled with like reference numerals and description for the like elements will be omitted.

As shown in FIG. 1, a printer 1 comprises a housing 2 having a substantially rectangular parallelepiped shape. Inside the housing 2, the printer 1 comprises a head unit 3, a conveyor unit 4, a sheet feed unit 5, and a tank unit 6, which are provided in this order from the top of the housing 2. The head unit 3 comprises a plurality of, e.g., four, recording heads 31. The conveyor unit 4 is configured to convey a recording sheet 10 in a conveying direction 99 (a direction from the left to the right in the drawing sheet of FIG. 1) under the recording heads 31. The sheet feed unit 5 is configured to feed a recording sheet 10 (a recording medium of paper). The tank unit 6 is configured to store, for example, ink therein. Inside the housing 2, the printer 1 further comprises a control unit 7 that is separated from the above-described units. The control unit 7 is configured to control operations of each unit. The printer 1 further comprises a sheet discharge portion 22 at an upper surface of the housing 2. A recording sheet 10 on which printing was performed is to be discharged on the sheet discharge portion 22.

The head unit 3 comprises the four recording heads 31, each of which is configured to eject ink therefrom. In this embodiment, the recording head 31 for black ink, the recording head 31 for cyan ink, the recording head 31 for magenta ink, and the recording head 31 for yellow ink are provided. The recording heads 31 are arranged in order of increasing lightness of color, i.e., black, cyan, magenta, and yellow, in this order, from upstream to downstream in the conveying direction 99.

The recording heads 31 have substantially the same structure. Each recording head 31 is a line-type inkjet head that has a substantially rectangular parallelepiped shape and is elongated in a print width direction 98. The print width direction 98 is a direction orthogonal to the conveying direction 99 along a horizontal surface. Each recording head 31 comprises a head body 32 having an ejecting surface 33 in which a plurality of ejection ports (not shown) are formed. The head body 32 is disposed such that the ejecting surface 33 thereof faces a recording sheet 10 to be conveyed in the conveying direction 99 by the conveyor unit 4. The ejecting surface 33 and a recording sheet 10 to be conveyed are left at a predetermined distance in a vertical direction, when the recording sheet 10 passes under the recording head 31. The head body 32 comprises a plurality of actuators (not shown) controlled by the control unit 7. The actuators apply ejection energy to ink such that the ink is selectively ejected from the ejection ports.

The tank unit 6 comprises a plurality of, e.g., four, ink tanks 23 detachably attached to the housing 2. The ink tanks 23 store black ink, cyan ink, magenta ink, and yellow ink, respectively. Ink is supplied from each ink tank 23 to the corresponding one of the recording heads 31 via a corresponding one of tubes (not shown).

The sheet feed unit 5 comprises a sheet feed tray 51 and a sheet feed roller 52. The sheet feed tray 51 is detachable from and attachable to the housing 2. The sheet feed tray 51 has a box shape with its top opened and accommodates therein a plurality of recording sheets 10 stacked in layers. The sheet feed roller 52 is in contact with an uppermost recording sheet 10 in the stack accommodated in the sheet feed tray 51. With rotation of the sheet feed roller 52, the recording sheets 10 accommodated in the sheet feed tray 51 are fed to a conveying path 50 (described later).

The conveyor unit 4 comprises a plurality of conveyor rollers 40 and platens 43. The conveyor rollers 40 are disposed along the conveying direction 99 of the recording sheet 10. Each of the platens 43 is disposed between the adjacent conveyor rollers 40. The platens 43 are disposed under the respective recording heads 31 so as to be opposite to the respective ejection surfaces 33. The platens 43 are support members that support a recording sheet 10 from below. One of the conveyor rollers 40 is disposed upstream from a most-upstream one of the recording heads 31 in the conveying direction 99, another one is disposed downstream from a most-downstream one of the recording heads 31 in the conveying direction 99, and each of the other ones is disposed between the adjacent recording heads 31. Each conveyor roller 40 comprises a pair of an upper roller 41 and a lower roller 42. With rotation of the lower rollers 42 of the conveyor unit 4 in synchronization with a conveyor motor 64 (see FIG. 2), a recording sheet 10 is conveyed toward the downstream side of the conveying direction 99 while sandwiched between the upper rollers 41 and the lower rollers 42.

The conveying path 50 of the recording sheet 10 extends from the sheet feed tray 51 to the sheet discharge portion 22 in the housing 2 as shown by black arrows in FIG. 1. The conveying path 50 is defined by a plurality of feeding guides 54, the conveyor unit 4, and a plurality of discharging guides 57 and is formed in a substantially inverted S shape. A recording sheet 10 fed by the sheet feed roller 52 from the sheet feed tray 51 into the conveying path 50 is conveyed to the conveyor unit 4 by a plurality of supply rollers 53 through the feeding guides 54. A registration roller pair 55 is disposed upstream from the conveyor unit 4 in the conveying direction 99. The skewing of the recording sheet 10 is corrected by the registration roller pair 55 and then the recording sheet 10 enters the conveyor unit 4. The conveyor unit 4 feeds the recording sheet 10 to each position, at which an image can be formed onto the recording sheet 10, under each recording head 31, and conveys the recording sheet 10 in the conveying direction 99 at a predetermined conveying speed at the time of image formation. In the downstream part of the conveying path 50 from the conveyor unit 4, the recording sheet 10 is upwardly conveyed along the discharging guides 57 by a plurality of discharge rollers 56 and then is discharged onto the sheet discharge portion 22 from a discharge port 21 provided in the top of the housing 2.

Figure 2:
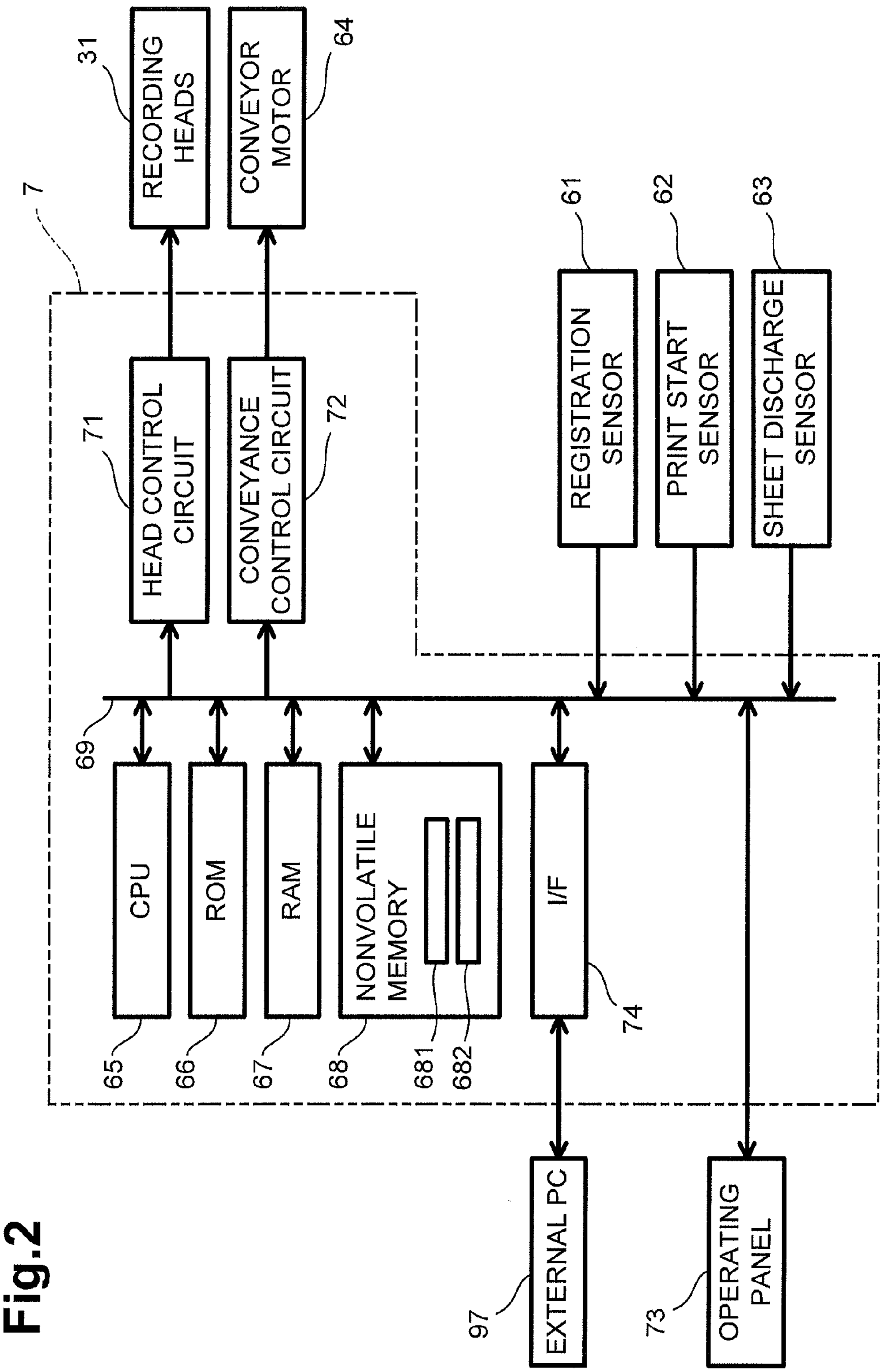
FIG. 2 is a block diagram showing a configuration of a controller of the printer in the embodiment according to one or more aspects of the invention.

A configuration of the printer 1 will be described with reference to FIG. 2. The control unit 7 of the printer 1 is configured to control overall operations of the printer 1. Hereinafter, a conveyance monitoring portion 84 of the control unit 7 will be described especially in detail.

The control unit 7 of the printer 1 comprises a central processing unit (CPU) 65, a read-only memory (ROM) 66, a random-access memory (RAM) 67, a nonvolatile memory 68, and an interface (I/F) 74, which are connected with each other via an internal channel 69. The CPU 65 is configured to centrally control each portion or unit of the printer 1. The ROM 66 is configured to store programs to be executed by the CPU 65. The RAM 67 is configured to be temporarily used as a storage space and a workspace during the execution of the program by the CPU 65. The nonvolatile memory 68 is configured to store various setting information. The interface 74 is connected with an external computer (PC) as an external device to transmit and receive data therebetween. The nonvolatile memory 68 stores, for example, settings and flags that need to be maintained after the power of the printer 1 is turned off. The information stored in the nonvolatile memory 68 includes at least a recording sheet detection flag 681 and a conveyance error detection flag 682. An initial state of the recording sheet detection flag 681 and the conveyance error detection flag 682 is an off state. A head control circuit 71, a conveyance control circuit 72, and an operating panel 73 including various operating buttons and a display panel, are connected with the control unit 7. Also, the control unit 7 may include a DMA (Direct Memory Access) device.

In addition, a registration sensor 61, a first sensor, e.g., a print start sensor 62, and a second sensor, e.g., a sheet discharge sensor 63 are connected with the control unit 7. Detection signals from the registration sensor 61, the print start sensor 62, and the sheet discharge sensor 63 are to be stored in the RAM 67 via the internal channel 69. The CPU 65 detects an edge of a recording sheet 10 by analyzing the stored detection signals based on the program stored in the ROM 66. As shown in FIG. 1, the registration sensor 61 is disposed upstream from the registration roller pair 55 in the conveying path 50. The registration sensor 61 is configured to detect whether a recording sheet 10 to be fed into the registration roller pair 55 exists. Based on the detection of the recording sheet 10 by the registration sensor 61, the control unit 7 allows the head unit 3 to start an operation for forming an image. The print start sensor 62 is disposed downstream from the registration roller pair 55 and upstream from an area in which an image forming is performed onto the recording sheet 10 by the head unit 3, in the conveying path 50. The print start sensor 62 is configured to detect a leading edge of the recording sheet 10 to be conveyed in the conveying path 50. Based on the timing at which the leading edge of the recording sheet 10 is detected by the print start sensor 62, ink is ejected from each recording head 31 of the head unit 3. The sheet discharge sensor 63 is disposed downstream from the area in which the image formation is performed on the recording sheet 10 by the head unit 3, in the conveying path 50. The sheet discharge sensor 63 is configured to detect a trailing edge of the recording sheet 10 to be conveyed in the conveying path 50.

Figure 3:
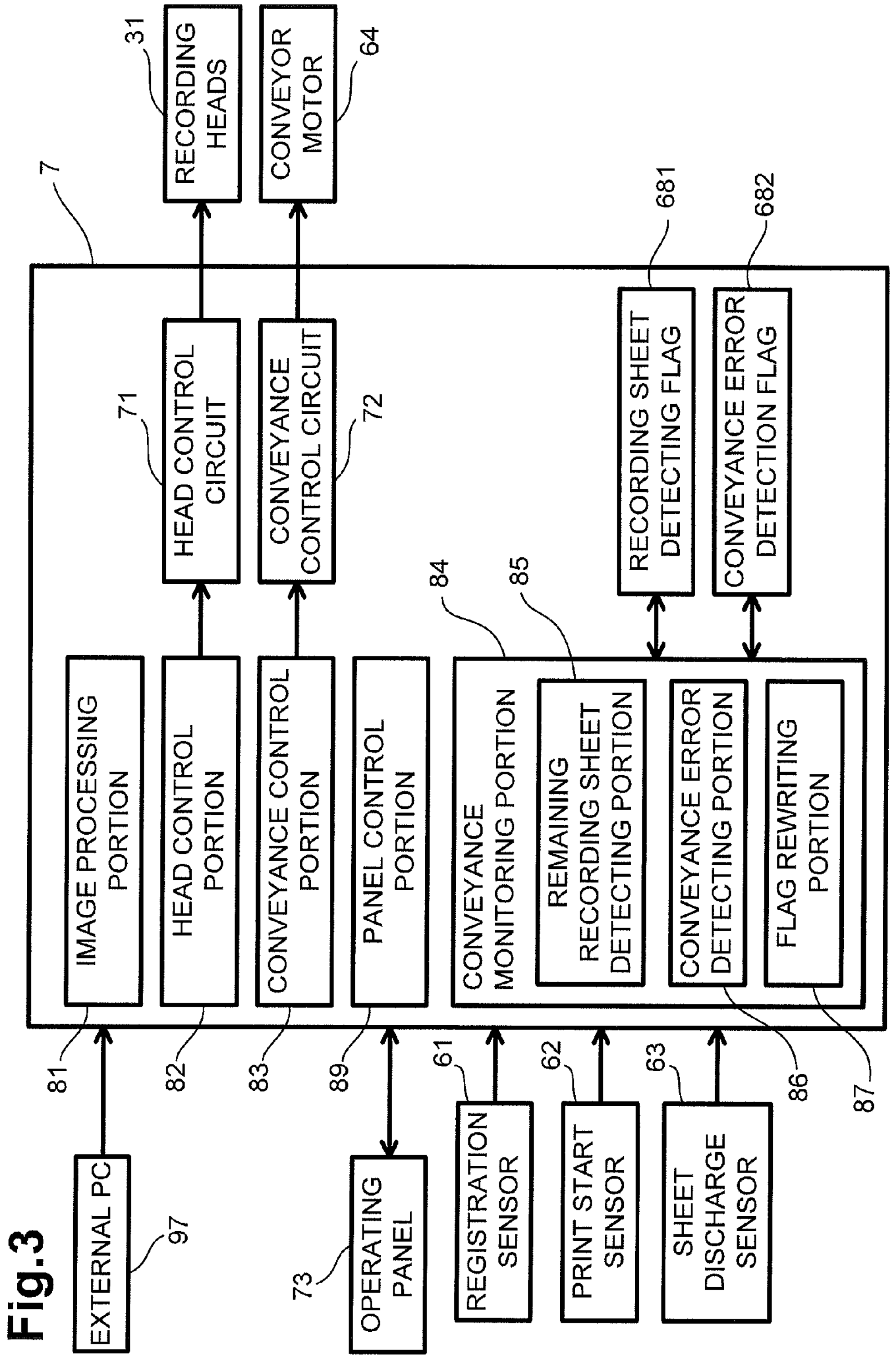
FIG. 3 is a functional block diagram of the controller of the printer in the embodiment according to one or more aspects of the invention.

Functions of the control unit 7 of the printer 1 will be described with reference to FIG. 3. The control unit 7 has functions of an image processing portion 81, a head control portion 82, a conveyance control portion 83, a conveyance monitoring portion 84, and a panel control portion 89. These functions of the control unit 7 are implemented by the execution of a predetermined program by the CPU 65. The program to be executed by the CPU 65 is stored in a storage medium, e.g., a flexible disk, a CD-ROM, or a memory card, and is installed in the ROM 66 from the storage medium. Also, the program may be saved from the storage medium to the terminal unit (for example, a personal computer and a server) which is separated from a printer, and the program may be saved in the ROM 66 by an external line from the terminal unit to the printer. Hereinafter, these functions of the control unit 7 will be described in detail.

The image processing portion 81 is configured to perform image processing on print data inputted from the external computer 97, a printer server, or a storage medium, to generate image output data. The head control portion 82 is configured to generate an output signal for the head control circuit 71 of the recording heads 31 based on the image output data, and is also configured to control the operations of the recording heads 31. The head control circuit 71 is configured to selectively eject ink onto the recording sheet 10 at predetermined timings from the respective recording heads 31 upon receipt of the output signal from the head control portion 82.

The conveyance control portion 83 is configured to control the rotation of the sheet feed roller 52, the supply rollers 53, the conveyor rollers 40, and the discharge rollers 56 to convey the recording sheet 10 along the conveying path 50 in synchronization with the operation of the recording heads 31, based on the image output data. The conveyance control circuit 72 is configured to drive the conveyor motor 64, which is connected with the sheet feed roller 52, the supply rollers 53, the conveyor rollers 40, and the discharge rollers 56. The conveyance control circuit 72 is configured to generate an electric signal for rotating the conveyor motor 64 upon receipt of the output signal from the conveyor control portion 83. In this embodiment, the sheet feed roller 52, the supply rollers 53, the conveyor rollers 40, and the discharge rollers 65 are driven by the single conveyor motor 64. However, a conveyor motor 64 may be provided for these rollers by each function. The conveyor motor 64 is configured to be rotated by receiving the electric signal from the conveyance control circuit 72, and a rotational force of the conveyor motor 64 is transmitted to the sheet feed roller 52, the supply rollers 53, the conveyor rollers 40, and the discharge rollers 56 via a well-known drive mechanism including gears and drive shafts.

The conveyance monitoring portion 84 is configured to monitor an occurrence of an error in the conveyance of a recording sheet 10 in the conveying path 50. The conveyance monitoring portion 84 comprises a flag rewriting portion 87, a conveyance error detecting portion 86, and a remaining recording sheet detecting portion 85. The flag rewriting portion 87 is configured to rewrite the state of the recording sheet detection flag 681 between on and off. The conveyance error detecting portion 86 is configured to detect a paper jam of a recording sheet 10 in the conveying path 50. The remaining recording sheet detecting portion 85 is configured to detect the presence or absence of a recording sheet 10 remaining in the conveying path 50 under the head unit 3. A function of the conveyance monitoring portion 84 will be described later in detail.

An image forming operation of the printer 1 will be described. First, the control unit 7 obtains print data transmitted from the external computer 97. That is, the control unit 7 obtains property information of a print job while receiving print data of each page one after another. The property information of the print job includes a size of a recording sheet 10 and a print resolution, for example. The image processing portion 81 of the control unit 7 generates image output data based on the obtained print data. The head control portion 82 and the conveyance control portion 83 output signals to the head control circuit 71 and the conveyance control circuit 72, respectively, based on the generated image output data. By doing so, the conveyor motor 64 is driven and the rotational force thereof is transmitted to the sheet feed roller 52, the supply rollers 53, the conveyor rollers 40, and the discharge rollers 56. Thus, a recording sheet 10 is fed from the sheet feed tray 51 along the conveying path 50, and ink is ejected from each recording head 31 toward the recording sheet 10 that is being conveyed. Therefore, an image is formed on the recording sheet 10.

In the image forming operation of the printer 1, the recording sheet 10 to be conveyed along the conveying path 50 is detected by the registration sensor 61, the print start sensor 62, and the sheet discharge sensor 63. The print start sensor 62 and the sheet discharge sensor 63 are disposed upstream and downstream, respectively, from the head unit 3 in the conveying path 50. The print start sensor 62 and the sheet discharge sensor 63 are optical sensors including a light emitting portion, which irradiates light onto the recording sheet 10, and a light receiving portion, which receives light reflected from the recording sheet 10. These sensors 62, 63 are configured to detect the presence or absence of a recording sheet 10 by receiving light reflected from the recording sheet 10 at the respective light receiving portions. The flag rewriting portion 87 of the control unit 7 rewrites the recording sheet detection flag 681 to the on state when the print start sensor 62 detected a leading edge of the recording sheet 10 (a first rewriting process). That is, based on a detection result of the print start sensor 62, the flag rewriting portion 87 replaces the information stored in the recording sheet detection flag 681 with the detection result. The flag rewriting portion 87 rewrites the recording sheet detection flag 681 to the off state when the sheet discharge sensor 63 detected a trailing edge of the recording sheet 10 (a second rewriting process). That is, based on a detection result of the sheet discharge sensor 63, the flag rewriting portion 87 replaces the information stored in the recording sheet detection flag 681 with the detection result. The print start sensor 62 and the sheet discharge sensor 63 are not limited to noncontact sensors, but may be contact sensors including detectors that are to be contacted with the recording sheet 10 being conveyed. The registration sensor 61 may combine the function of the print start sensor 62 with its function. That is, the flag rewriting portion 87 may rewrite the recording sheet detection flag 681 to the on state when the registration sensor 61 detected a leading edge of a recording sheet 10.

The flag rewriting portion 87 does not rewrite the state of the recording sheet detection flag 681 between on and off with respect to every recording sheet 10 to be conveyed, but is configured to change a cycle of rewriting the recording sheet detection flag 681 in accordance with a length L of a recording sheet 10 in the conveying direction 99 (simply referred to as a sheet length) and a distance α between successive recording sheets conveyed in the conveying direction 99 (simply referred to as a sheet-to-sheet distance).

Figure 4:
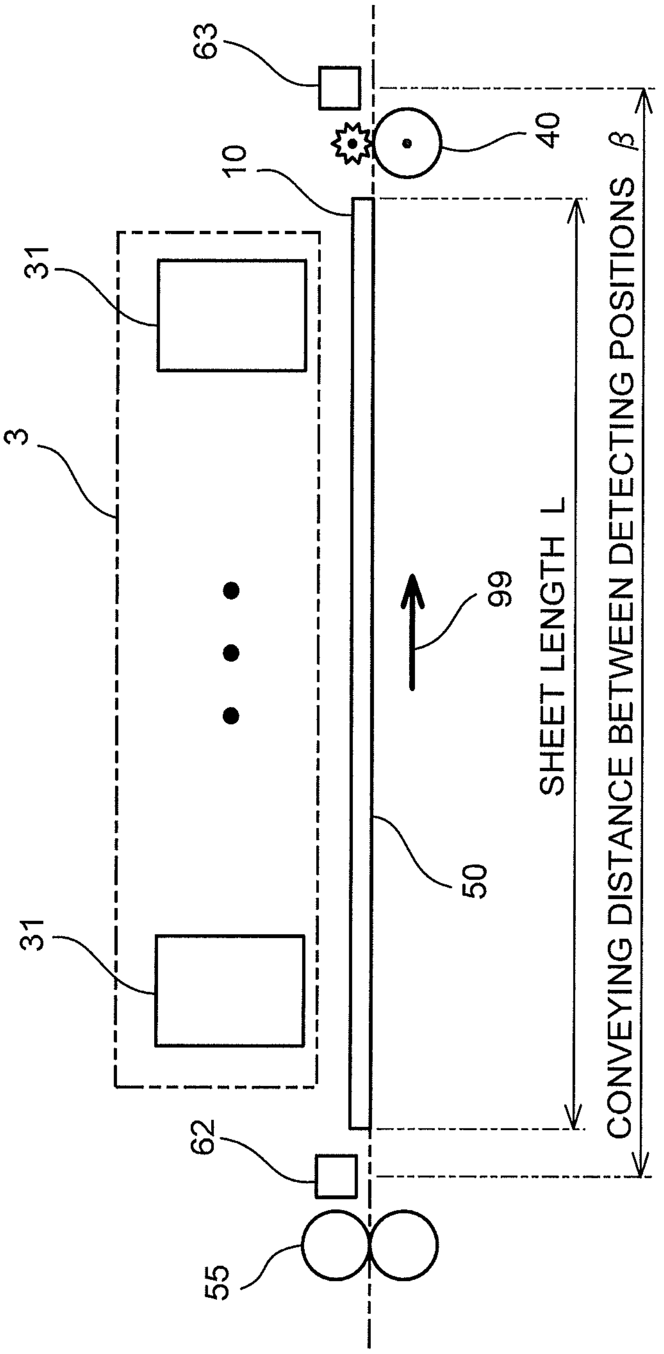
FIG. 4 is a drawing illustrating a relationship between a sheet length L and a conveying distance between detecting positions β, of a recording sheet to be conveyed in a conveying path under a head unit in the embodiment according to one or more aspects of the invention.

As shown in FIG. 4, a dimension between a leading edge and a trailing edge of a recording sheet 10 in the conveying direction 99 refers to the sheet length L. The sheet length L differs according to types of recording sheets 10. The control unit 7 stores sheet lengths L associated with the types (standards and sizes) of the recording sheets 10. Therefore, the flag rewriting portion 87 can obtain a sheet length L of a recording sheet 10 based on the type of the recording sheet 10 that is information included in the print data. The sheet length L may be obtained by actual measurement of a recording sheet 10 at a position upstream from the registration sensor 61 in the conveying path 50.

Figure 5:
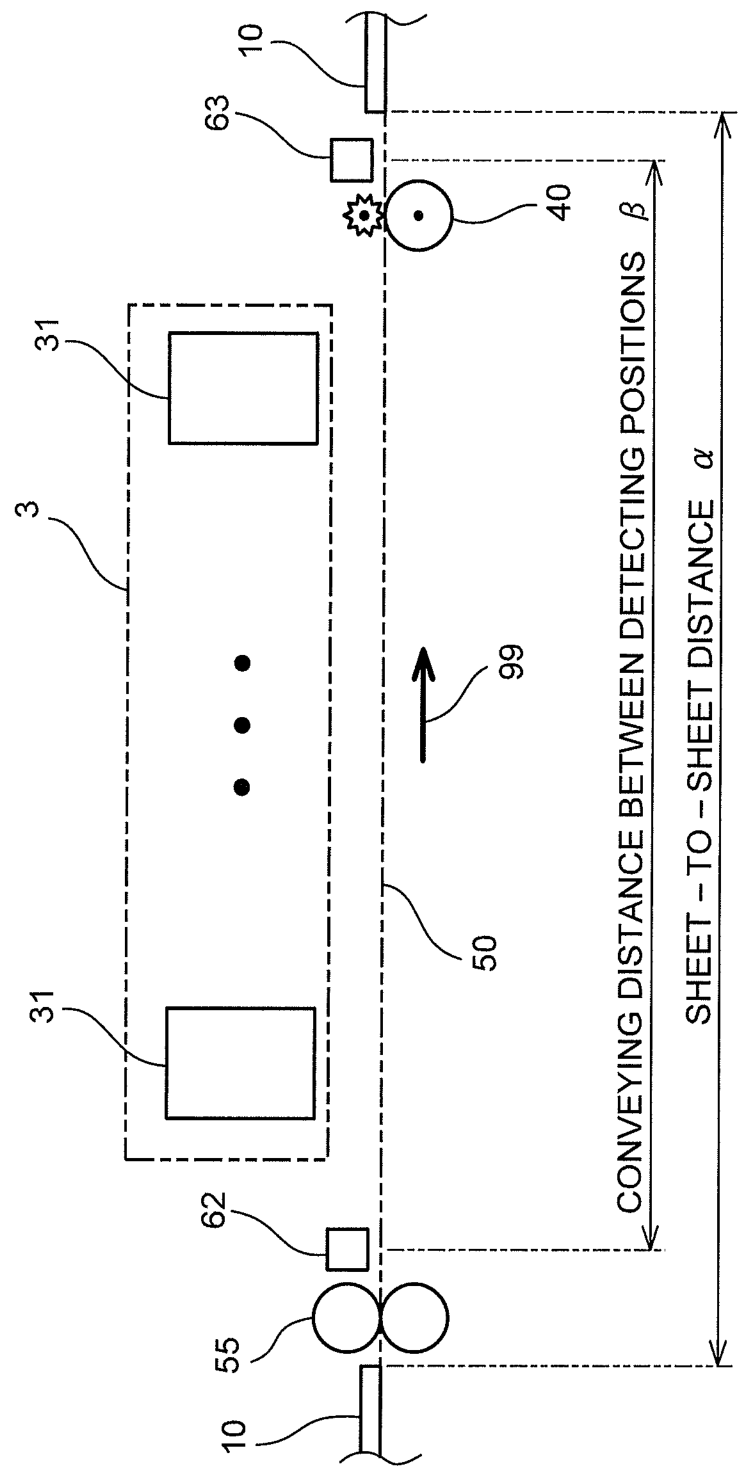
FIG. 5 is a drawing illustrating a relationship between a sheet-to-sheet distance α between recording sheets successively conveyed and the conveying distance between detecting positions β in the embodiment according to one or more aspects of the invention.

As shown in FIG. 5, a distance between a trailing edge of a preceding recording sheet 10 and a leading edge of a next-following recording sheet 10 being successively conveyed in the conveying direction 99 under the head unit 3 by the conveyor unit 4 is referred to as the sheet-to-sheet distance α. The sheet-to-sheet distance α may differ on each print job, and more strictly, is specified by a difference in a feeding timing by the registration roller pair 55 between a preceding recording sheet 10 and a next-following recording sheet 10. However, if the sheet-to-sheet distance α is obtained by detecting the feeding timing of the recording sheets 10 by the registration roller pair 55, the sheet-to-sheet distance α cannot be obtained before the conveyance of the recording sheet 10 starts. Therefore, the sheet-to-sheet distance α is estimated based on a timing at which a recording sheet 10 is fed from the sheet feed tray 51 by the sheet feed roller 52, and a value of the estimated sheet-to-sheet distance α is used by the flag rewriting portion 87. The timing at which the recording sheet 10 is fed by the sheet feed roller 52 is controlled by the conveyance control portion 83 based on the type (the standard and size) of the recording sheet 10 and the image resolution, which is information included in the print data. The sheet-to-sheet distance α becomes greater as an area of a print surface in the recording sheet 10 becomes larger, and also becomes greater as the image resolution becomes higher. The sheet-to-sheet distance α is generally standardized on each print job. If, however, a plurality of types of recording sheets 10 are to be used in a print job or a page having a heavy print duty is isolatedly included in a print job, the sheet-to-sheet distance α may differ among successive recording sheets 10 in the single print job. In that case, the largest value of α is used as the sheet-to-sheet distance of the print job.

As shown in FIGS. 4 and 5, a recording sheet conveying distance from a detecting position of the print start sensor 62 and a detecting position of the discharge sensor 63 refers to a conveying distance between detecting positions β. The detecting position of the print start sensor 62 exists downstream from the registration roller pair 55 and upstream from the head unit 3 in the conveying direction 99. The detecting position of the sheet discharge sensor 63 exists downstream from the head unit 3 in the conveying direction 99. The conveying distance between detecting positions β is a device-specific value of the printer 1 and is predetermined and stored in the RAM 67 in the control unit 7.

Figure 6:
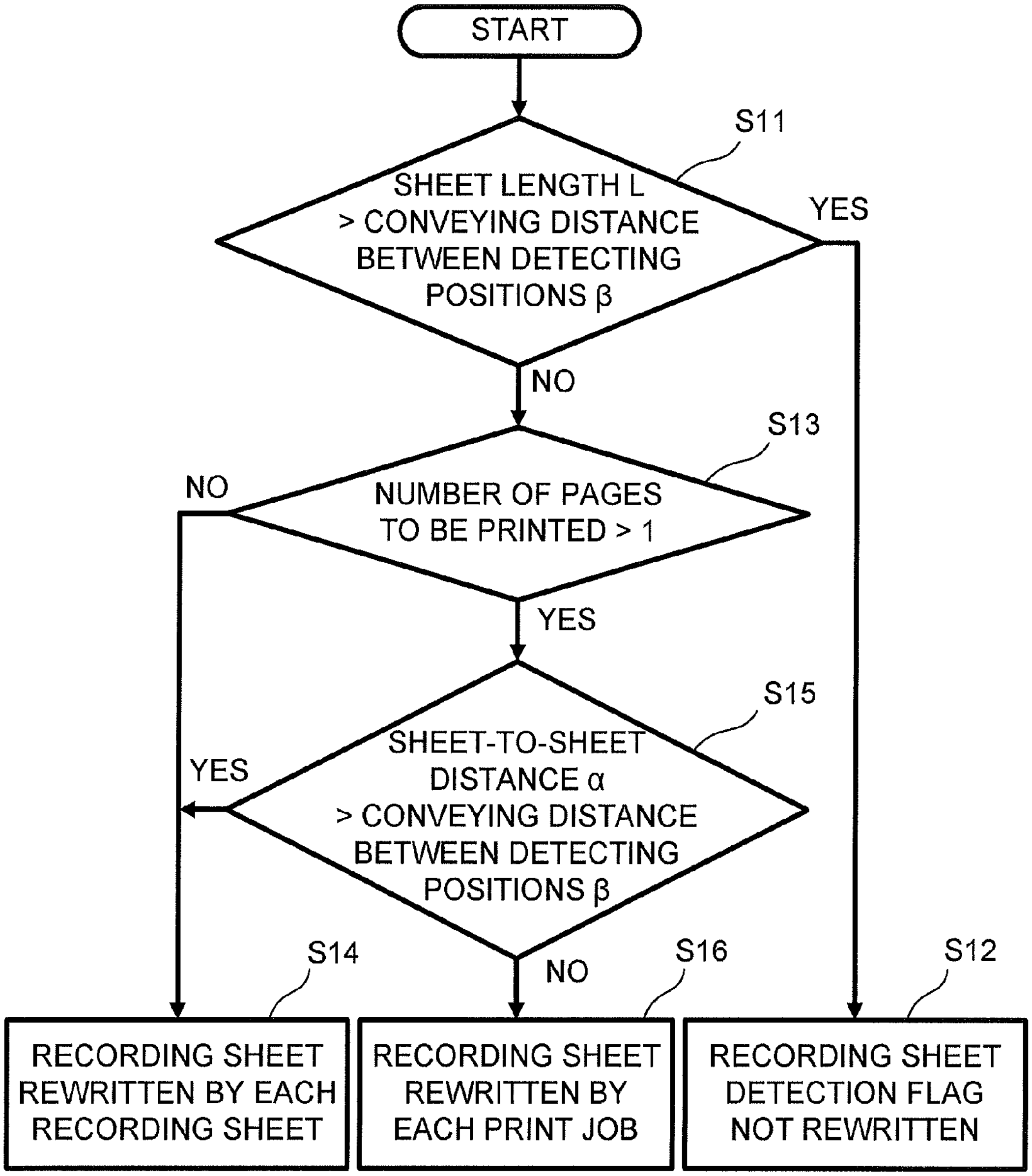
FIG. 6 is a flowchart of determining a rewriting cycle of a recording sheet detection flag in the embodiment according to one or more aspects of the invention.

A method for determining a rewriting cycle of the recording sheet detecting flag 681 by the flag rewriting portion 87 will be described with reference to FIG. 6.

First, the flag rewriting portion 87 obtains a sheet length L of a recording sheet 10 with respect to a print job of an image forming operation to be performed, and compares the sheet length L of the recording sheet 10 and the conveying distance between detecting positions β (step S11, hereinafter, S stands for a step). When the sheet length L is greater than the conveying distance between detecting positions β (YES at S11), the flag rewriting portion 87 does not rewrite the recording sheet detection flag 682 with respect to the current print job (S12). That is, the recording sheet detection flag 681 is maintained in the off state with respect to the current print job.

When the sheet length L is less than or equal to the conveying distance between detecting positions β (NO at S11), the flag rewriting portion 87 obtains the number of pages included in the print job and determines whether the number of pages included in the print job is more than one, i.e., whether a plurality of recording sheets 10 are to be successively fed (S13). The number of pages to be printed is information included in at least one of print data and image output data. When the number of pages to be printed is one (NO at S13), the recording sheet detection flag 681 with respect to the print job will be rewritten by each page, i.e., every recording sheet 10 (S14). That is, the flag rewriting portion 87 rewrites the recording sheet detection flag 681 to the on state when the print start sensor 62 detected the leading edge of the recording sheet 10, and rewrites the recording sheet detection flag 681 to the off state when the sheet discharge sensor 63 detected the trailing edge of the recording sheet 10.

When the number of pages to be printed is more than one (YES at S13), the flag rewriting portion 87 obtains the sheet-to-sheet distance α and compares between the sheet-to-sheet distance α and the conveying distance between detecting positions β (S15). Here, instead of the conveying distance between detecting positions β, a threshold value α0, in which a moving distance of the recording sheet 10 when an emergency stop of the conveyance of the recording sheet 10 occurs due to a sliding of the recording sheet 10 is factored into the conveying distance between detecting positions β, may be used. The threshold value α0 is smaller than the conveying distance between detecting positions β, and is set in the control unit 7 in advance when the threshold value α0 is to be used.

When the sheet-to-sheet distance α is greater than the conveying distance between detecting positions β (YES at S15), the recording sheet detection flag 681 will be rewritten by each page, i.e., every recording sheet 10 (S14). When the sheet-to-sheet distance α is less than or equal to the conveying distance between detecting positions β (NO at S15), the recording sheet detection flag 681 will be rewritten by every print job (S16). That is, the flag rewriting portion 87 rewrites the recording sheet detection flag 681 to the on state when the print start sensor 62 detected a leading edge of a first recording sheet 10 in a print job, and rewrites the recording sheet detection flag 681 to the off state when the sheet discharge sensor 63 detected a trailing edge of a last recording sheet 10 in the print job.

As described above, the rewriting cycle of the recording sheet detection flag 681 is determined based on the relationship between the conveying distance between detecting positions β and the sheet length L or the relationship between the conveying distance between detecting positions β and the sheet-to-sheet distance α. The flag rewriting portion 87 rewrites the state of the recording sheet detection flag 681 based on the determined rewriting cycle. The on/off information rewritten by the flag rewriting portion 87 and stored in the recording sheet detection flag 681 is used when an abnormal conveyance of a recording sheet 10, i.e., a paper jam, occurred. Hereinafter, an operation for detecting a conveyance error by the conveyance error detecting portion 86 will be described.

During the conveyance of the recording sheet 10, after the print start sensor 62 detected a leading edge of the recording sheet 10, the conveyance error detecting portion 86 always determines whether a trailing edge of the recording sheet 10 has been detected within a predetermined time. When the trailing edge of the recording sheet 10 has been detected within the predetermined time since its leading edge was detected by the print start sensor 62, the sheet discharge sensor 63, which is disposed downstream from the print start sensor 62 in the conveying path 62, performs the determination in a similar manner. The conveyance error detection portion 86 determines that a conveyance error has occurred when the trailing edge of the recording sheet 10 has not been detected within the predetermined time since its leading edge was detected in each of the print start sensor 62 and the sheet discharge sensor 63. When the conveyance error has occurred, the conveyance error detection portion 86 rewrites the conveyance error detecting flag 86 to an on state and the control unit 7 stops the driving of the printer 1.

After the conveyance error of the recording sheet 10 has occurred in the conveying path 50, a user may turn the power of the printer 1 off in order to resolve the conveyance error. Although the power of the printer 1 is turned off, the on/off information stored in the recording sheet detection flag 681 and the conveyance error detection flag 682 is maintained. The remaining recording sheet detecting portion 85 detects a recording sheet 10 remaining in the conveying path 50 based on the on/off information stored in the recording sheet detection flag 681 and the conveyance error detection flag 682 when the power of the printer 1 is turned on.

Figure 7:
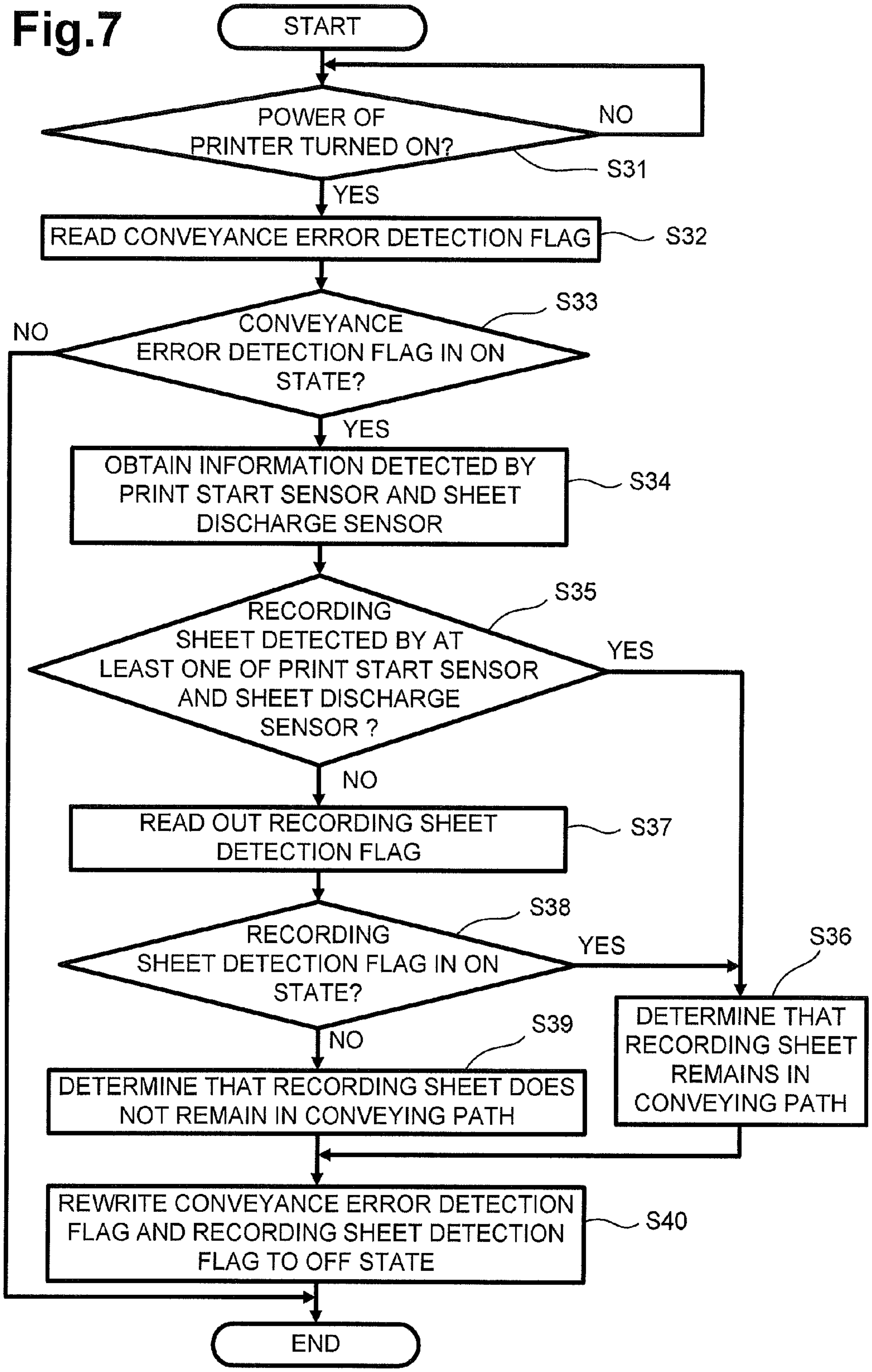
FIG. 7 is a flowchart of a procedure for detecting a recording sheet remaining in the conveying path under the head unit in the embodiment according to one or more aspects of the invention.

Next, a procedure of detecting a recording sheet 10 by the remaining recording sheet detecting portion 85 will be described with reference to FIG. 7. The procedure of detecting a recording sheet 10 shown in FIG. 7 is performed while the conveyance of the recording medium is stopped.

When the power of the printer 1 is turned on (YES at S31), the remaining recording sheet detecting portion 85 reads out the on/off information stored in the conveyance error detection flag 682 (S32). When the conveyance error detection flag 682 is in the on state (YES at S33), processing for detecting a recording sheet 10 is performed. First, the remaining sheet detecting portion 85 obtains the information detected by the print start sensor 62 and the sheet discharge sensor 63, i.e., the information about the presence or absence of a recording sheet 10 detected by the print start sensor 62 and the sheet discharge sensor 63 (S34). When a recording sheet 10 has been detected by at least one of the print start sensor 62 and the sheet discharge sensor 63 (YES at S35), the remaining recording sheet detecting portion 85 determines that the recording sheet 10 remains in the conveying path 50 under the head unit 3 (S36). When the recording sheet 10 has not been detected by both of the print start sensor 62 and the sheet discharge sensor 63 (NO at S35), the remaining recording sheet detecting portion 85 reads out the information recorded in the recording sheet detection flag 681.

When the recording sheet detection flag 681 is in the on state (YES at S38), the remaining recording sheet detecting portion 85 determines that the recording sheet 10 remains in the conveying path 50 under the head unit 3 (S36). When the recording sheet detection flag 681 is in the off state (NO at S38), the remaining recording sheet detecting portion 85 determines that the recording sheet 10 does not remain in the conveying path 50 under the head unit 3 (S39).

In a line printer for multi-color printing like the printer 1 according to this embodiment, the plurality of recording heads 31 are generally arranged in line along the conveying path 50 of the recording sheet 10. In order to make such a line printer more compact in size, spacing between adjacent recording heads 31 is required to be narrower. With this structure, a sensor cannot be disposed between each of the recording heads 31. Therefore, the sensors (the print start sensor 62 and the sheet discharge sensor 63) of the recording sheet 10 are arbitrarily disposed upstream and downstream, respectively, from the head unit 3 in the conveying path 50. However, if a recording sheet 10 remains under the head unit 3 due to the conveyance error, there may be a case where the recording sheet 10 remaining under the head unit 3 cannot be detected by the print start sensor 62 and the sheet discharge sensor 63 only depending on the relationship between the conveying distance between detecting positions β and the sheet length L. For example, when the sheet length L is greater than or equal to the conveying distance between detecting positions β, the recording sheet 10 can be detected by at least one of the print start sensor 62 and the sheet discharge sensor 63. However, when the sheet length L is shorter than the conveying distance between detection positions β, the recording sheet 10 cannot be detected by either of the print start sensor 62 or the sheet discharge sensor 63 if the recording sheet 10 exists between the detecting positions of the sheet print start sensor 62 and the sheet discharge sensor 63. In the latter case, the recording sheet 10 remaining under the head unit 3 can be detected based on the information stored in the recording sheet detection flag 681. When a plurality of recording sheets 10 are successively conveyed and the sheet-to-sheet distance α between each of the recording sheets successively conveyed is shorter than the conveying distance between detecting positions β, the recording sheets 10, except the first and last recording sheets 10, are detected by at least one of the print start sensor 62 and the sheet discharge sensor 63 although the sheet length L of the recording sheet 10 is shorter than the conveying distance between detecting positions β.

Although not shown, one or more sensors, which detect a recording sheet 10, are disposed at appropriate positions in a feeding path of the conveying path 50 defined by the feeding guides 54 and the supply rollers 53 and in a discharging path of the conveying path 50 defined by the discharge guides 57 and discharge rollers 56. The control unit 7 is also configured to determine whether a recording sheet 10 remains in the feeding path or the discharging path based on detection signals from the sensors disposed in the feeding path and the discharging path, in addition to the processing for detecting a recording sheet 10 by the remaining recording sheet detecting portion 85. When the control unit 7 determines the presence or absence of the remaining recording sheet 10 and locates the position of the remaining recording sheet 10, the control unit 7 displays information of the conveyance error, e.g., the presence or absence of the remaining recording sheet 10 and the location of the remaining recording sheet 10, on the operating panel 73 via the panel control portion 89. When confirmed that the recording sheet 10 remaining in the conveying path 50 was removed by the user, the remaining recording sheet detecting portion 85 rewrites the recording sheet detection flag 681 and the conveyance error detection flag 682 to the off state (the initial state) (S40). In this embodiment, the initial state of the recording sheet detection flag 681 and the conveyance error detection flag 682 is the off state. However, the initial state of either one or both of the flags 681, 682 may be the on state. In this case, the description will be made with the state of the flags 681, 682 replaced between on and off.

As described above, in the processing performed by the conveyance monitoring portion 82 in the printer 1, the rewriting cycle of the recording sheet detection flag 681 is determined by the relationship between the conveying distance between detecting positions β and the sheet length L or between the conveying distance between detecting positions β and the sheet-to-sheet distance α. In particular, when the recording sheets 10 are conveyed at high speed and the sheet-to-sheet distance α a is shorter than or equal to the conveying distance between detecting positions β, the recording sheet detection flag 681 is rewritten by each print job. When the sheet length L is greater than the conveying distance between detecting positions β, the recording sheet detection flag 681 is not rewritten. That is, the rewriting process of the recording sheet detection flag 681, which is to be performed to detect a recording sheet 10 remaining between the print start sensor 62 and the sheet discharge sensor 63 in the conveying path 50 when the conveyance error of the recording sheet 10 occurs, is performed, and otherwise omitted. By doing so, a frequency of rewriting the recording sheet detection flag 681 (the number of times the rewriting occurs per print job) can be reduced without loss of the remaining recording sheet detecting function as compared with a case where the recording sheet detection flag 681 is rewritten for each recording sheet at all times. As a result, the number of accesses to the recording sheet detection flag 681 by the flag rewriting portion 78 is minimized and a processing load of the control unit 7 can be reduced. There is a limit to the number of times of rewriting the recording sheet detection flag 681 because the nonvolatile memory 68 including the recording sheet detection flag 681 will be deteriorated due to the rewriting. However, the reduction of the number of times the rewriting the recording sheet detection flag 681 occurs can prevent the life of the nonvolatile memory 68 from being shorten.

In the processing of the conveyance monitoring portion 84 of the printer 1, when the sheet length L of the recording sheet 10 is shorter than or equal to the conveying direction between detecting positions β and the sheet-to-sheet distance α of a plurality of recording sheets 10 successively conveyed is greater than the conveying direction between detecting positions β, the recording sheet detection flag 681 is rewritten by each recording sheet. When the sheet length L is shorter than or equal to the conveying distance between detecting positions β0 and the sheet-to-sheet distance α of a plurality of recording sheets 10 successively conveyed is shorter than or equal to the conveying distance between detecting positions β, the recording sheet detection flag 681 is rewritten to the on state with respect to a first recording sheet 10 conveyed in a job and then the recording sheet detection flag 681 is rewritten to the off state with respect to a last recording sheet 10 in the job. When the sheet-to-sheet distance α is shorter than or equal to the conveying distance between detecting positions β, the recording sheets 10, except the first and last recording sheets 10, can be detected by at least one of the print start sensor 62 and the sheet discharge sensor 63 if the conveyance of the recording sheet 10 is stopped due to the conveyance error while the recording sheet 10 exists in the conveying path

50 under the head unit 3. As described above, the sheet length L of the recording sheet 10 and the conveying distance between detecting positions β are compared therebetween and the sheet-to-sheet distance α of a plurality of recording sheets 10 successively conveyed and the conveying distance between detecting positions β are compared therebetween. Based on the comparison results, the rewriting cycle of the recording sheet detection flag 681 is selected from each recording sheet and each job. Accordingly, the number of times the rewriting the recording sheet detection flag 681 occurs can be reduced without loss of the remaining recording sheet detecting function.

In the processing performed by the conveyance monitoring portion 84 in the printer 1, when the sheet length L is shorter than or equal to the conveying distance between detecting positions β and the number of recording sheets 10 to be conveyed in a print job is one, the recording sheet detection flag 681 is rewritten with respect to the recording sheet 10 to be conveyed. In this case, the recording sheet 10 cannot be detected by either of the print start sensor 62 or the sheet discharge sensor 63 when the conveyance of the recording sheet 10 is stopped due to the conveyance error while the recording sheet 10 exists between the detecting positions of the print start sensor 62 and the sheet discharge sensor 63. However, the remaining recording sheet 10 can be detected based on the information stored in the recording sheet detection flag 681.

In addition, in the processing performed by the conveyance monitoring portion 84 in the printer 1, the recording sheet 10 remaining between the print start sensor 62 and the sheet discharge sensor 63 in the conveying path 50 is detected based on the information stored in the recording sheet detection flag 68 while the conveyance of the recording sheet 10 is stopped. The nonvolatile memory 68 includes the recording sheet detection flag 681. The information stored in the nonvolatile memory 68 is maintained if the power of the printer 1 is turned off and thus the power is not supplied to the nonvolatile memory 68. Therefore, if the power of the printer 1 is turned off due to the occurrence of the conveyance error in the conveying path 50, the recording sheet 10 remaining in the conveying path 50 can be detected based on the information stored in the nonvolatile memory 68.

While the invention has been described in detail with reference to the specific embodiment thereof, it would be apparent to those skilled in the art that various changes, arrangements and modifications may be applied therein without departing from the spirit and scope of the invention.

In the above-described embodiment, for example, the flag rewriting portion 87 of the control unit 7 of the printer 1 determines the rewriting cycle of the recording sheet detection flag 681 based on print data. The determination of the rewriting cycle of the recording sheet detection flag 681 may be performed by a printer driver that is included in an external device, e.g., the external PC 97, which transmits print data. In this case, for example, the rewriting cycle of the recording sheet detection flag 681 may be determined by the printer driver in a similar manner as the flag rewriting portion 87, and the determined rewriting cycle may be transmitted from the external PC 97 to the printer 1 together with the print data. In the printer 1, the rewriting cycle can be obtained from the received print data and the flag rewriting portion 87 can rewrite the recording sheet detection flag 681 in accordance with the rewriting cycle.

The operation for detecting the conveyance error in the printer 1 is not limited to the above-described embodiment. For example, another embodiment of the operation for detecting the conveyance error may be adopted. The power of the printer 1 may suddenly be turned off due to a user's operation, a break in a wire, or a power failure during the conveyance of the recording sheet 10, for example. The on/off information stored in the recording sheet detection flag 681 is maintained although the power of the printer 1 is turned off. In this other embodiment of the operation for detecting the conveyance error, the remaining recording sheet detecting portion 85 is configured to detect a recording sheet 10 remaining in the conveying path 50 based on the on/off information stored in the recording sheet detection flag 681 when the power of the printer 1 is turned on.

Figure 8:
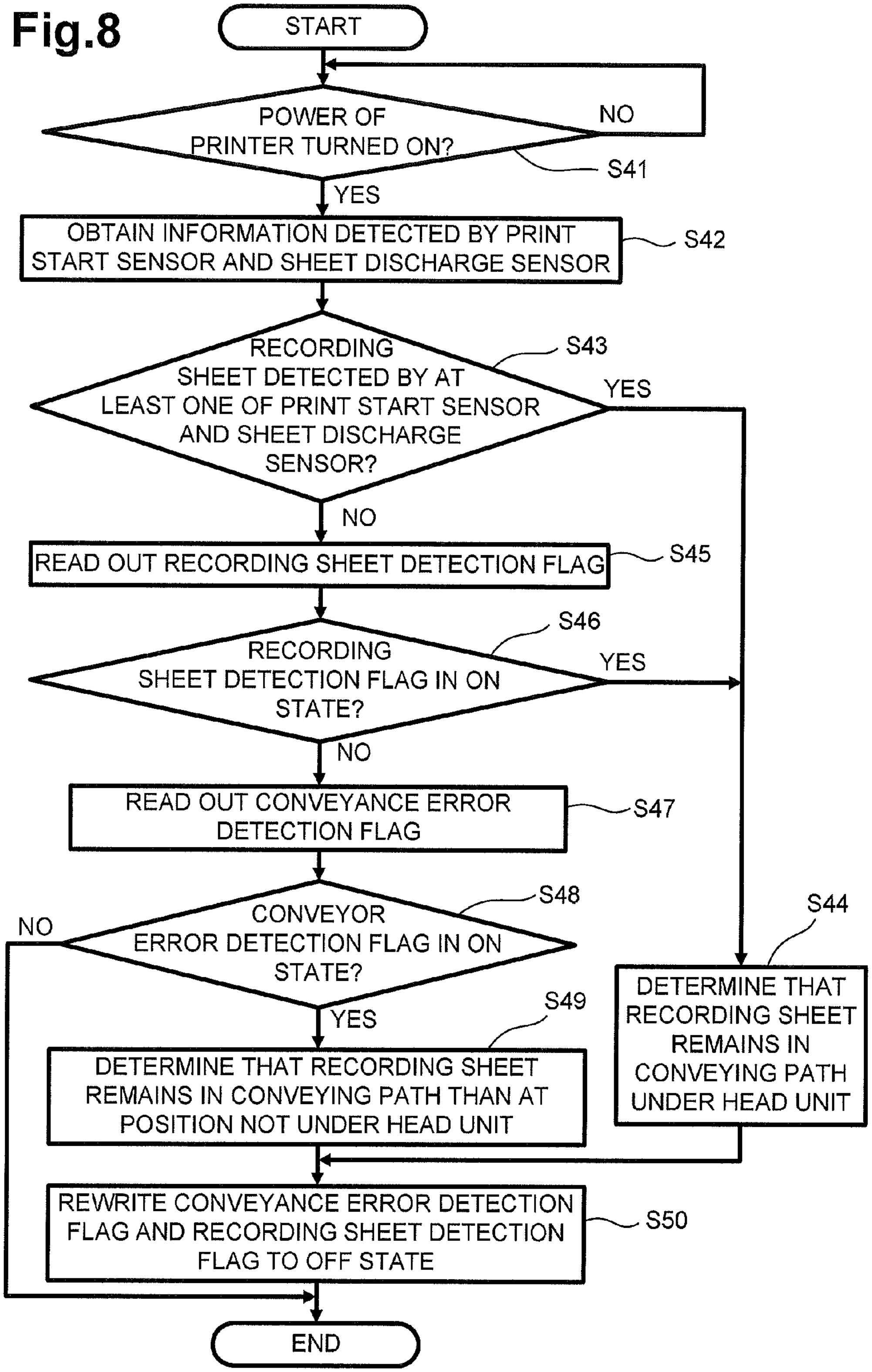
FIG. 8 is a flowchart of a procedure for detecting a recording sheet remaining in the conveying path under the head unit in another embodiment according to one or more aspects of the invention.

A procedure of detecting a recording sheet 10 by the remaining recording sheet detecting portion 85 according to this other embodiment will be described with reference to FIG. 8. The procedure of detecting a recording sheet 10 shown in FIG. 8 is performed while the conveyance of the recording medium is stopped.

When the power of the printer 1 is turned on (YES at S41), the remaining recording sheet detecting portion 85 obtains the information detected by the print start sensor 62 and the sheet discharge sensor 63, i.e., the information of the presence or absence of a recording sheet 10 detected by the print start sensor 62 and the sheet discharge sensor 63 (S42). When the recording sheet 10 has been detected by at least one of the print start sensor 62 and the sheet discharge sensor 63 (YES at S43), the remaining recording sheet detection portion 85 determines that the recording sheet 10 remains in the conveying path 50 under the head unit 3 (S44). When no recording sheet 10 has been detected by either of the print start sensor 62 and the sheet discharge sensor 63 (NO at S43), the remaining recording sheet detection portion 85 reads out the information stored in the recording sheet detection flag 681 (S45).

When the recording sheet detection flag 681 is in the on state (YES at S46), the remaining recording sheet detecting portion 85 determines that the recording sheet 10 remains in the conveying path 50 under the head unit 3 (S44). When the recording sheet detection flag 681 is in the off state (NO at S46), the remaining recording sheet detection portion 85 reads out the on/off information stored in the conveyor error detection flag 682 (S47). When the conveyor error detection flag 682 is in the off state (NO at S48), the remaining recording sheet detecting portion 85 determines that no recording sheet 10 remains in the conveying path 50. When the conveyor error detection flag 682 is in the on state (YES at S48), the remaining recording sheet detecting portion 85 determines that a recording sheet 10 remains in the conveying path 50 at a position not under the head unit 3 (S49).

While the invention has been described in detail with reference to the specific embodiments thereof, it would be apparent to those skilled in the art that various changes, arrangements and modifications may be applied therein without departing from the spirit and scope of the invention. For example, the invention can be applied to not only printers, but also devices having an image forming function, such as copying machines, multifunction devices, and facsimile machines. The image forming portion (the head unit 3 in the embodiments) may not be limited to the inkjet type, but may be an electrophotographic type. The image forming portion may perform color printing or monochrome printing.

In an image forming apparatus, such as a copying machine, a multifunction device, a printer, and a facsimile machine, in which information stored in a rewritable storage device is rewritten in order to detect a recording medium remaining in a conveying path, the invention may be effective at reducing a processing load of the image forming apparatus by reducing the number of times of rewriting information stored in the storage device.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The storage medium is a computer readable storage device, which may be, for example, a magnetic, optical, electronic, electromagnetic, infrared, or semiconductor system, apparatus, or device, or any suitable combination of the foregoing; however, the computer readable storage device is not limited to these examples. Additional particular examples of the computer readable storage device can include: a portable computer diskette, a hard disk, a magetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage device is also not limited to these examples. Any tangible medium that can contain, or store a program for use by or in connection with an instruction execution system, apparatus, or device could be a computer readable storage device.

What is claimed is:

1. An image forming apparatus comprising:
- a conveyor unit configured to convey a recording medium along a conveying path;
- an image forming unit disposed in the conveying path and configured to form an image onto the recording medium conveyed along the conveying path;
- a first sensor disposed in the conveying path at a detecting position upstream from the image forming unit and configured to detect the recording medium;
- a second sensor disposed in the conveying path at a detecting position downstream from the image forming unit and configured to detect the recording medium;
- a nonvolatile memory configured to maintain a first detection result of the first sensor and a second detection result of the second sensor after the image recording apparatus is turned off; and
- a controller configured to:
  - determine whether a length of the recording medium is less than or equal to a conveying distance between the detecting positions of the first sensor and the second sensor;
  - perform a first storing process for storing the first detection result of the first sensor in the nonvolatile memory and a second storing process for storing the second detection result of the second sensor in the nonvolatile memory when the controller determines that the length of the recording medium is less than or equal to the conveying distance between the detecting positions;
  - start a recording medium remaining determination process in response to turning on power of the image forming apparatus from the power of the image forming apparatus being off; and
  - determine, in the recording medium remaining determination process, whether the recording medium remains between the first sensor and the second sensor in the conveying path based on the first detection result and the second detection result stored in the nonvolatile memory.

2. The image forming apparatus according to claim 1, wherein the controller is further configured to:
- determine whether the length of the recording medium is greater than the conveying distance between the detecting positions; and
- not perform the first and second storing processes when the controller determines that the length of the recording medium is greater than the conveying distance between the detecting positions.

3. The image forming apparatus according to claim 1, wherein the controller is further configured to:
- determine whether a distance between recording media successively conveyed in a single print job is less than or equal to the conveying distance between the detecting positions; and
- perform the first storing process for the first recording medium in the single print job and the second storing process for the last recording medium in the single print job when the controller determines that the length of the recording medium is less than or equal to the conveying distance between the detecting positions and the distance between recording media successively conveyed in the single print job is less than or equal to the conveying distance between the detecting positions.

4. The image forming apparatus according to claim 1, wherein the controller is further configured to perform the first and second storing processes for a single recording medium of a single recording medium print job when the length of the recording medium along the conveying path is less than or equal to the conveying distance between the detecting positions.

5. The image forming apparatus according to claim 1, wherein the controller is further configured to:
- determine whether a distance between recording media successively conveyed is greater than the conveying distance between the detecting positions; and
- perform the first and second storing processes for each recording medium when the controller determines that the length of the recording medium is less than or equal to the conveying distance between the recording media successively conveyed is greater than the conveying distance between the detecting positions.

6. The image forming apparatus according to claim 1, wherein the controller is further configured to determine, in the recording medium remaining determination process, the recording medium remains between the first sensor and the second sensor in the conveying path when at least one of the first sensor and the second sensor detect the recording medium.

7. A method for monitoring conveyance of a recording medium in an image forming apparatus including a conveyor unit configured to convey a recording medium along a conveying path, an image forming unit disposed in the conveying path and configured to form an image onto the recording medium conveyed along the conveying path, a first sensor disposed in the conveying path at a detecting position upstream from the image forming unit and configured to detect the recording medium, a second sensor disposed in the conveying path at a detecting position downstream from the image forming unit and configured to detect the recording medium, and a nonvolatile memory configured to maintain a first detection result of the first sensor and a second detection result of the second sensor after the image recording apparatus is turned off, the method comprising the steps of:

determining whether a length of the recording medium is less than or equal to a conveying distance between the detecting positions of the first sensor and the second sensor;

performing a first storing process for storing the first detection result of the first sensor in the nonvolatile memory and a second storing process for storing the second detection result of the second sensor in the nonvolatile memory when the controller determines that the length of the recording medium is less than or equal to the conveying distance between the detecting positions;

starting a recording medium remaining determination process in response to turning on power of the image forming apparatus from the power of the image forming apparatus being off; and determining, in the recording medium remaining determination process, whether the recording medium remains between the first sensor and the second sensor in the conveying path based on the first detection result and the second detection result stored in the nonvolatile memory.

8. The method according to claim 7, further comprising the steps of:

determining whether the length of the recording medium is greater than the conveying distance between the detecting positions; and not performing the first and second storing processes when the controller determines that the length of the recording medium is greater than the conveying distance between the detecting positions.

9. The method according to claim 7, further comprising the steps of:

determining whether a distance between recording media successively conveyed is greater than the conveying distance between the detecting positions; and performing the first and second storing processes for each recording medium when the controller determines that the length of the recording medium is less than or equal to the conveying distance between the detecting positions and the distance between the recording media successively conveyed is greater than the conveying distance between the detecting positions.

10. The method according to claim 7, further comprising the steps of:

determining whether a distance between recording media successively conveyed in a single print job is less than or equal to the conveying distance between the detecting positions; and performing the first storing process for the first recording medium in the single print job and the second storing process for the last recording medium in the single print job when the controller determines that the length of the recording medium is less than or equal to the conveying distance between the detecting positions and the distance between recording media successively conveyed in the single print job is less than or equal to the conveying distance between the detecting positions.

11. The method according to claim 7, further comprising the step of:

performing the first and second storing processes for a single recording medium of a single recording medium print job when the length of the recording medium along the conveying path is less than or equal to the conveying distance between the detecting positions.

12. A non-transitory computer-readable storage device storing a computer-executable program executable by a processor of an image forming apparatus including a conveyor unit configured to convey a recording medium along a conveying path, an image forming unit disposed in the conveying path and configured to form an image onto the recording medium conveyed along the conveying path, a first sensor disposed in the conveying path at a detecting position upstream from the image forming unit and configured to detect the recording medium, a second sensor disposed in the conveying path at a detecting position downstream from the image forming unit and configured to detect the recording medium, and a nonvolatile memory configured to maintain a first detection result of the first sensor and a second detection result of the second sensor after the image recording apparatus is turned off, the program causing the processor to execute functions comprising:

determining whether a length of the recording medium is less than or equal to a conveying distance between the detecting positions of the first sensor and the second sensor;

performing a first storing process for storing the first detection result of the first sensor in the nonvolatile memory and a second storing process for storing the second detection result of the second sensor in the nonvolatile memory when the controller determines that the length of the recording medium is less than or equal to the conveying distance between the detecting positions;

starting a recording medium remaining determination process in response to turning on power of the image forming apparatus from the power of the image forming apparatus being off; and determining, in the recording medium remaining determination process, whether the recording medium remains between the first sensor and the second sensor in the conveying path based on the first detection result and the second detection result stored in the nonvolatile memory.

13. The non-transitory computer-readable storage device according to claim 12, wherein the program further causes the processor to execute functions comprising:

determining whether the length of the recording medium is greater than the conveying distance between the detecting positions; and not performing the first and second storing processes when the controller determines that the length of the recording medium is greater than the conveying distance between the detecting positions.

14. The non-transitory computer-readable storage device according to claim 12, wherein the program further causes the processor to execute functions comprising:

determining whether a distance between recording media successively conveyed is greater than the conveying distance between the detecting positions; and performing the first and second storing processes for each recording medium when the controller determines that the length of the recording medium is less than or equal to the conveying distance between the detecting positions and the distance between the recording media successively conveyed is greater than the conveying distance between the detecting positions.

15. The non-transitory computer-readable storage device according to claim 12, wherein the program further causes the processor to execute functions comprising:

determining whether a distance between recording media successively conveyed in a single print job is less than or equal to the conveying distance between the detecting positions; and performing the first storing process for the first recording medium in the single print job and the second storing process for the last recording medium in the single print job when the controller determines that the length of the recording medium is less than or equal to the conveying distance between the detecting positions and the distance between recording media successively conveyed in the single print job is less than or equal to the conveying distance between the detecting positions.

16. The non-transitory computer-readable storage device according to claim 12, wherein the program further causes the processor to execute the function comprising:

performing the first and second storing processes for a single recording medium of a single recording medium print job when the length of the recording medium along the conveying path is less than or equal to the conveying distance between the detecting positions.

* * * * *